United States Patent
Blohm et al.

(10) Patent No.: US 6,922,254 B2
(45) Date of Patent: Jul. 26, 2005

(54) METHOD FOR MEASURING THE DIAMETER OF AN ELONGATED ARTICLE OF A CIRCULAR CROSS SECTION

(75) Inventors: Werner Blohm, Bremen (DE); Harald Sikora, Bremen (DE); Adrian Beining, Bötersen (DE)

(73) Assignee: Sikora Industrieelektronik GmbH (DE)

( * ) Notice: Subject to any disclaimer, the term of this patent is extended or adjusted under 35 U.S.C. 154(b) by 53 days.

(21) Appl. No.: 10/008,998

(22) Filed: Dec. 4, 2001

(65) Prior Publication Data

US 2002/0044289 A1 Apr. 18, 2002

Related U.S. Application Data

(63) Continuation of application No. 09/211,614, filed on Dec. 15, 1998, now abandoned.

(30) Foreign Application Priority Data

Dec. 20, 1997 (DE) .......................................... 197 57 067

(51) Int. Cl.⁷ ............................................. G01B 11/02
(52) U.S. Cl. ..................................................... 356/638
(58) Field of Search .................. 356/635, 638, 356/639, 640; 250/559.12, 559.13, 559.24

(56) References Cited

U.S. PATENT DOCUMENTS

| | | | |
|---|---|---|---|
| 3,765,774 A | * 10/1973 | Petrohilos | 356/638 |
| 4,461,576 A | 7/1984 | King | |
| 4,676,648 A | * 6/1987 | Schulz et al. | 356/638 |
| 4,854,707 A | * 8/1989 | Ring et al. | 356/496 |
| 4,978,223 A | * 12/1990 | Kutchenriter et al. | 356/640 |
| 5,359,418 A | * 10/1994 | Zaleski | 356/640 |
| 6,346,988 B1 | * 2/2002 | Bartunek et al. | 356/635 |

FOREIGN PATENT DOCUMENTS

| | | | |
|---|---|---|---|
| DE | 27 29 576 | | 1/1979 |
| DE | 32 34 330 A1 | | 4/1983 |
| FR | 2371673 | * | 6/1978 |

OTHER PUBLICATIONS

"Vermessung von Drehteilen durch Beugungsmusteranalyse" by Helmut Ackermann, et al., *Technisches Messen* 63 (1996), pp. 83–92.

"Application Note on Measuring the Diameter of Small Fibers," *Laser Focus*, Sep. 1967.

* cited by examiner

*Primary Examiner*—Richard A. Rosenberger
(74) *Attorney, Agent, or Firm*—Kilpatrick Stockton LLP (57) ABSTRACT

A method for measuring the diameter of an elongated article approximately circular in cross section, in particular of a wire or of a cable, which may include some or all of the following:

- illumination of the article with a fan-shaped beam of at least one monochromatic light source approximately point shaped in the measuring plane, wherein the main beam direction stands preferably perpendicular on the longitudinal axis of the article
- receiving the light on a single or multiple lined light-sensitive sensor on the oppositely lying side of the article, wherein the axis of the sensor stands preferably perpendicular on the main beam direction
- measuring the distance of the article to the sensor or the light source
- determining a value corresponding to the article diameter by evaluating the intensity patterns in the diffraction patterns at the edges of the shadow caused by the article, and of the measured diameter
- the distance of the light source to the article or of the sensor to the article is selected such that the diffraction effect of oppositely lying edges of the article do not superimpose one another or only insignificantly superimpose one another in the plane of the sensor.

56 Claims, 6 Drawing Sheets

METHOD FOR MEASURING THE DIAMETER OF AN ELONGATED ARTICLE OF A CIRCULAR CROSS SECTION

CROSS-REFERENCE TO RELATED APPLICATIONS

This application is a continuation of U.S. Ser. No. 09/211,614 filed on Dec. 15, 1998, now abandoned, which claims priority to German Patent Application No. 19757067.4 filed on Dec. 20, 1997.

BACKGROUND OF THE INVENTION

The invention relates to a method for measuring the diameter of an elongated article, in particular a cable of a small diameter, according to the preamble of patent claim 1.

It is known to determine the diameter of cables or other elongated articles in an optical way in that it is irradiated with the light of a light source, wherein the main beam direction is approximately perpendicular to the longitudinal axis of the article. On the opposite side the light under the application of refracting surfaces (lenses, objectives, etc.) is projected onto a cellular light-sensitive sensor, wherein the measured object casts a shadow onto the line sensor. The shadow edges are acquired; their distance is a measure of the diameter.

With the practical application of the known device it is hindered by contaminations at the light entrance openings and light exit openings. It is therefore also known to so select the optic that at the light entrance and light exit openings the light becomes defocussed. Partial contaminations influence the measurement then only in a limited manner.

The known optical devices function in principle in a satisfactory manner, but are however relatively complicated and have a large construction.

BRIEF SUMMARY OF THE INVENTION

It is therefore the object of the invention to specify a method for measuring the diameter of an elongated article which in cross section is approximately circular, in particular of an artery or of a cable of a small diameter, which succeeds with little expenditure, yet brings with it very exact results, although the article changes in its position transverse to its longitudinal extension within limits.

This object is achieved by the features of patent claims 1 and 2.

With the method according to the invention the article is irradiated with the fan-shaped beam of a monochromatic point shaped light source. The intermediate connecting of optical elements between the light source and the article and the sensor may where appropriate be done away with. A bundling, parallelising or other influencing or deformation of the beam may be done away with. The shadow of the article is projected onto a linear light-sensitive sensor of a construction type known per se. For example a so-called CCD-line may be used which comprises approx. 2048 individual light-sensitive elements at a distance of 14 $\mu$m. Such a sensor has a high resolution.

It is to be understood that also a multiple-line sensor (surface sensor) of a suitable resolution may be applied. The lines thereof are then evaluated separately.

The measured signals caused by the diffraction give conclusions on the position of the diffracting edge in the measuring space. This is exploited by the invention. On account of the appearances of diffraction e.g. the geometric shadow edges do not directly result from the pattern of intensity of the irradiation incident on the sensor, but rather they must be derived from the diffraction patterns which are formed. This may be evaluated by a comparison to a pattern $f(\xi)$ of the intensity in the diffracting pattern known from the theory of Fresnel diffraction. With this the argument of the function $f(\xi)$: $\xi = f(x - x_{geo})$ applies. The pattern of intensity in the diffraction pattern with a predetermined distance of the diffracting edge to the receiving sensor is selected e.g. as a standard pattern (base pattern) with the extension d=1. This is because a mathematical description of the intensity pattern is not possible without further ado. The free parameter d (extension of the basis pattern $f(\xi_o)$) and $x_{geo}$ (searched geometric shadow edge=displacement of the base pattern $f(\xi_o)$) are varied for so long until an optimal correlation between $f(\xi)$ and the pattern of the intensity in the measured diffraction pattern.

Alternatively also sample patterns $f(\xi_1), f(\xi_2), \ldots f(\xi_N)$ may be derived from discrete values for d and $x_{geo}$, in order then to be brought to coincide with the intensity pattern in the measured diffraction pattern (sample comparison).

A further possibility according to the invention lies in using only a few characteristic feature points in the diffraction patterns (e.g. turning points and/or local intensity minima and maxima) for determining the geometric shadow edges. The position of the feature points in the intensity pattern of the diffraction pattern is characteristic for the position of the diffraction edges in the measuring space, e.g. for those of the shadow edges. Also the gradient between feature points of the intensity pattern e.g. in the region of the geometric shadow edges (e.g. up to the first maximum) permits the determination of the diameter or the position of the geometric shadow edge.

With fan-like expanding light irradiation for determining the article diameter from the geometric shadow edges, the knowledge of the distance of the measured object perpendicular to the line sensor is necessary. The position of the article transverse to its longitudinal extension during the measurement may indeed change. This is e.g. the case with cables during the movement from the place of production to a winding device. At the same time not only the does the distance of the shadow edges change on account of the beam, but rather on the outer contour of the article also the position of the edges causing the diffracting changes. Specifically these edges lie where two beams being emitted from the light source contact the outer contour on the left and right in the form of tangents. Both diffracting edges as a result lie on a chord of the article cross section assumed as circular. This chord may be caught as a replacement aperture. The nearer the article lies to the light source the further is this replacement aperture distanced from the circle centre of the article cross section. For taking this effect into account likewise the knowledge of the distance is of significance.

The mentioned distance may also be evaluated from the pattern of movement. The extension d as well as also the distance between characteristic feature points in the diffraction pattern represent a measure for this.

Generally the determining of the distance of the measured objective relative to the line sensor may also be effected also with the aid of any additional measuring means. Preferred is the application of a second identical measuring system, consisting of a point-shaped monochromatic light source and a line sensor with a measuring axis which lies perpendicular on the measuring axis of the first measuring system. Principally also more than two measuring systems may be applied. Thus roughly three systems may be positioned to one another at angle of 120° in each case.

Further, essential to the invention is that the geometry of the fan-shaped light beam, the distances from the light source, article and sensor as well as the diameter region of the article may always be selected such that the diffracting effects from the edges of the article lying opposite one another do not mutually interfere in the plane of the sensor.

The method according to the invention requires an extraordinarily less complicated measuring system. Lenses, objectives or similar optical elements which are always the source of imaging errors, blurring, etc. may where appropriate be done away with. Since no imaging errors occur on account of the known mathematically exactly describable physics of the diffraction appearances, a highly precise determination of the diameter is possible. Furthermore a further advantage lies in the fact that the measuring system on account of the elimination of refracting surfaces is constructed extraordinarily small. It may however be advantageous to provide an optical arrangement between the light source and the article, which permits a reduction of the distance between these objects. By way of this the measuring device is constructed even smaller.

Contaminations in the region of the measuring system by their nature lead to erroneous measurements. These may be reduced in that the optical active zone of the light source parallel to the longitudinal axis of the article has a certain extension, i.e. is linear whilst perpendicular to this it remains a point projector as before. If e.g. a diode laser for the measurement according to the invention in the optically active zone has a height in the picture plane of approx. 3 $\mu$m then its length, i.e. the extension perpendicular to the picture plane is e.g. 0.5 mm.

Analogously the extension of the individual elements of the light-sensitive sensor parallel to the longitudinal axis of the article may be selected significantly larger than in the axis direction of the line sensor. Contaminations on the light source or the sensor do not make themselves so noticeable in the same interfering manner as they would occur with a purely point-shaped design of the light source and sensor element. By way of the assessment according to the invention as a result a type of defocussing effect is produced.

Partial contaminations on the light source, for example of a laser diode, of a convergent lens or on the picture sensor, likewise cause diffracting effects which appear as diffracting pictures on the sensor. It is to be noted that the frequency spectrum of the intensity fluctuations caused by the diffracting is higher the closer is their location of origin to the sensor. Contaminations on the sensor cause extreme high-frequency intensity fluctuations whilst those on the irradiation source have the effect of low-frequency fluctuations. The intensity fluctuations from the object to be measured caused by diffractions have as a result a frequency spectrum which lies between these extremes. According to the invention a filtering of the measured intensity pattern is effected by the sensor in a manner such that if possible only one frequency spectrum is reached for evaluation, which is caused by the diffracting of the article. If with the device for carrying out the method the dimensions are selected such that also with the application of protective glasses on the one hand between the irradiation source and the object to measured and on the other hand between the picture or line sensor and the object to be measured, frequency spectrums which can be differentiated arise, then with the help of sa suitable filter method also with a partial contamination in the measuring device a reliable measurement may be carried out.

It is further to be noted that the extension factor d of the diffraction patterns and as a result also the distance between characteristic feather points is smaller the closer the diffracting edge lies to the receiver sensor. The evaluation of only such diffraction patterns, whose extensions d are relevant for the valid positions of the measured object, thus reduces the dirt sensitivity and thus permits a more reliable measurement. If only characteristic feature points are evaluated, then from the distance between consecutive points it may be deduced whether the measured diffraction space is caused by the measured object or from e.g. contamination in the measuring path.

If instead of a single point projector several are applied which either are tightly packed or have a more or less large distance to one another, and if these are operated alternately, its is possible to extend the measuring region. Likewise by way of a suitable evaluation if the intensity courses brought out on the sensor line the respective point projectors, the sensitivity to dirt may be reduced. In the individual patterns specifically there appears a different local shifting between such patterns of diffraction, which are brought out by objects in the valid measuring, and those which result from (dirt) objects located outside this region.

Also the individual intensity patterns on the lines of multi-lines sensors may be exploited for reducing contamination influences. For example that line may be selected for determining the geometric shadow edge with which no or the smallest contamination is detected.

Additionally to the "electronic" measures for reducing the dirt-sensitivity or also alternatively means may be provided in order to minimise the influence of contaminations on the measuring system. Thus for example between the laser and the measuring object two distanced slot arrangement, may be provided between which an electrode for an electrostatic "suctioning" of dust or other contaminations is arranged. In the same manner between the measuring object and the line sensor an electrode may be provided. In this case the slot arrangements then lie at earth. Another possibility may lie in continuously producing an excess pressure in the measuring space which prevents contaminations from entering into the measuring space. A third possibility lies in setting up a rinsing charge in the measuring space or on the parts at danger from contamination. For example an air pressure charge is applied.

BRIEF DESCRIPTION OF THE DRAWINGS

The invention is hereinafter described in more detail by way of drawings.

DETAILED DESCRIPTION OF THE INVENTION

Figure 1:
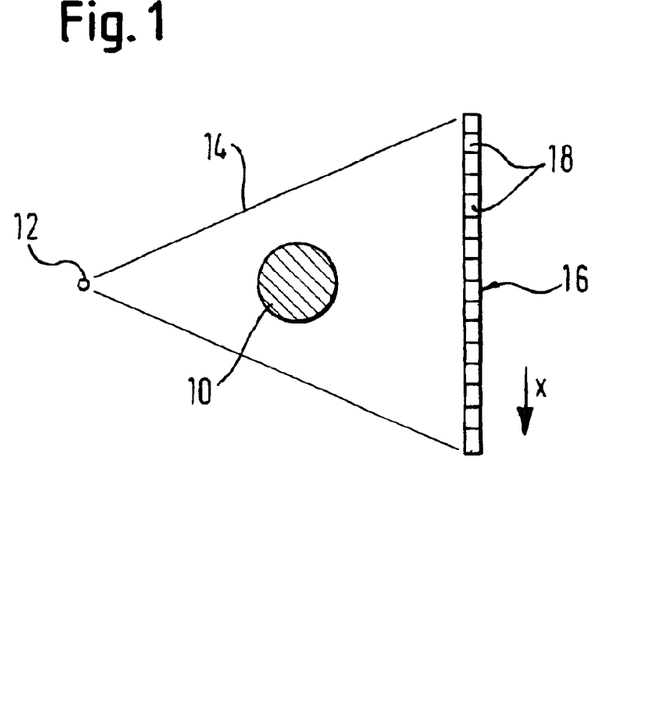
FIG. 1 shows schematically a measuring device for carrying out the method according to the invention.

In FIG. 1 the cross section of an elongated article, a wire or a cable 10 (subsequently as a measuring object a cable is described). It is to be understood that also any other threadlike object may be measured which extends perpendicularly to the plane of the drawing and which is moved forwards for example at 10 mm/sec to 30 m/sec. The device for manufacturing the cable as well as for producing its forward displacement are not shown. They are generally known. The cable has e.g. a diameter of 0.5 mm to 100 mm and more.

On the left side of the cable 10 there can be recognised a point-shaped light source 12. It may be formed by a laser diode, which e.g. produces IR light. The point shapedness results preferably in the extension which lies in the measuring plane, which is characterised by the fan-beam 14. In this direction e.g. the active zone of the laser diode 12 is 3 μm wide. Perpendicular to this, i.e. parallel to the longitudinal axis of the cable 10 there may result an extension of the optically active zone of e.g. 0.5 mm.

On the side lying opposite the laser diode 12 there is indicated a line sensor 16 whose longitudinal axis lies in the picture plane and perpendicular on the main extension direction of the irradiation of the laser diode 12. The individual elements 18 of the sensor, for example of a CCD line or of an individual line of a CCD matrix have an extension in the picture plane of e.g. 12 μm and a distance to one another of about 14 μm. The line may, as known per se, be provided with e.g. 2048 cells or elements, if the diameter of the article is approximately maximum 15 mm.

The cable 10 produces a shadow on the line sensor, whose extension is representative of the diameter of the cable 10. The extension of the shadow is on account of the fan-shaped broadening beam path not equal to the diameter of the cable. The distance of the longitudinal axis of the cable 10 to the line sensor is therefore to be taken into account with the measurement, and specifically in the manner that the measured shadow extension is to be multiplied with by factor (<1) derived from the beam principle. Since the replacement aperture relative to the middle point of the cable cross section likewise varies with the distance between the light source 12 and the cable 10, this dependency is likewise to be taken into account.

On the outer edges of the cable 10 the monochromatic light of the laser diode 12 undergoes a diffraction. The intensity pattern resulting therefrom is shown simplified in FIG. 2. The pattern of the geometric shadow as would set in also without appearances of diffraction is drawn in dashed and is indicated at 20. Apart from the light diffracted in the geometric shadow region left and right of the geometric shadow edges, intensity patterns with slowly decaying, alternately successive intensity maxima and minima are registered. This pattern resulting on account of travel time differences (interference) is called diffraction pattern. The maxima resulting from superposition are indicated at 24, the minima relating to deletions are indicated at 26. The frequency with which these maxima/minima follow one another is dependent on the distance between the diffracting edge and the sensor line. The intensity pattern in the diffraction space varies about a middle level 28 as it would set in without a measuring object.

The geometry of all objects taking part with the measuring arrangement is such that the diffraction patterns do not influence each other in a mutually interfering manner.

Figure 2:
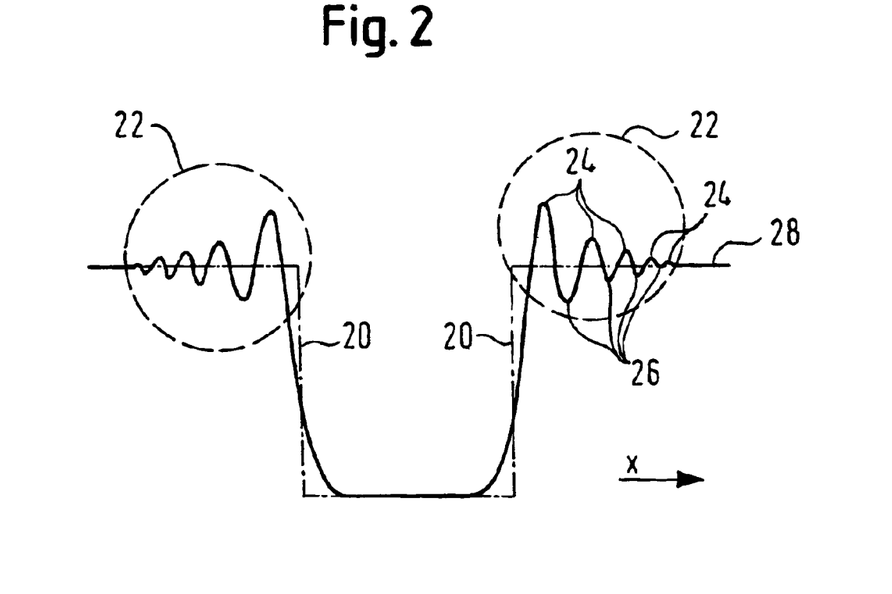
FIG. 2 shows idealised the intensity pattern on the irradiation receiver according to FIG. 1.

The intensity pattern as is to be recognised in FIG. 2 is in its shape as well as its length on the receiving line characteristic for the position of the diffraction pattern in the measuring space. The geometric shadow edge on the receiving line may be determined by a comparison with theoretically determined sample patterns, but may also be determined by individual characteristic feature points (e.g. turning points, intensity maxima or minima) in the diffraction pattern.

A partial contamination of the laser diode 12 and/or of the sensor line 16 leads. to further diffraction effects which superimpose to the curve pattern according to FIG. 2. An elimination of this interfering effect lies in evaluating only such diffraction patterns with certain extension factors or with certain distances of the characteristic feature points. Taking into account the frequency spectrum as arises by diffraction on the cable 10 within the valid measuring zone, furthermore by way of band-pass filtering the measurement can be made less susceptible to dirt. All methods can also be applied with the application of non-shown protective glasses between the light source 12 and the cable 10 on the one hand, and between the cable 10 and the line sensor 16 on the other hand.

Figure 3:
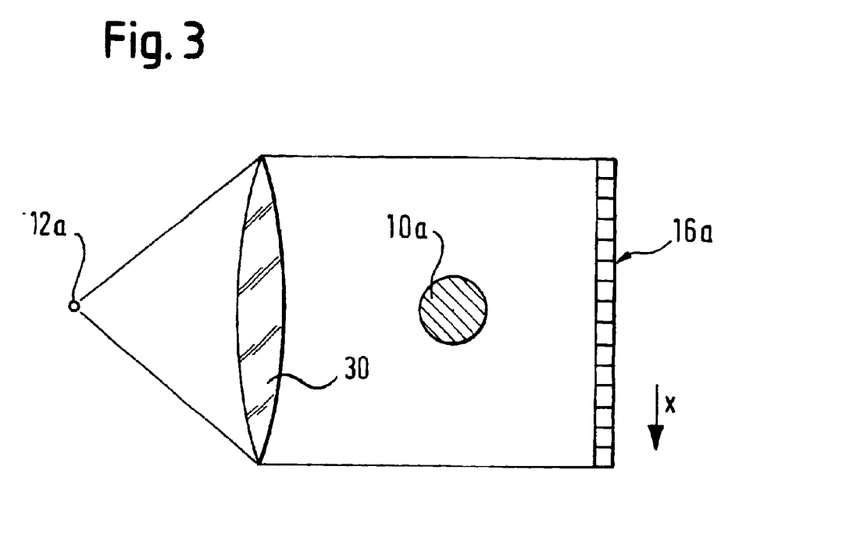
FIG. 3 shows a modified device for carrying out the method according to the invention.

With the embodiment form according to FIG. 3 a light source 12a is shown which is equal to the light source according to FIG. 1. The same applies to the sensor line 16a. In FIG. 3 however there is shown a lens 30 by which means focussed bundled light is cast onto the cable 10a. By way of this the device is reduced in its dimensions, and on the other hand the advantage is retained of having a measuring region which is larger than with the device according to FIG. 1.

Figure 4:
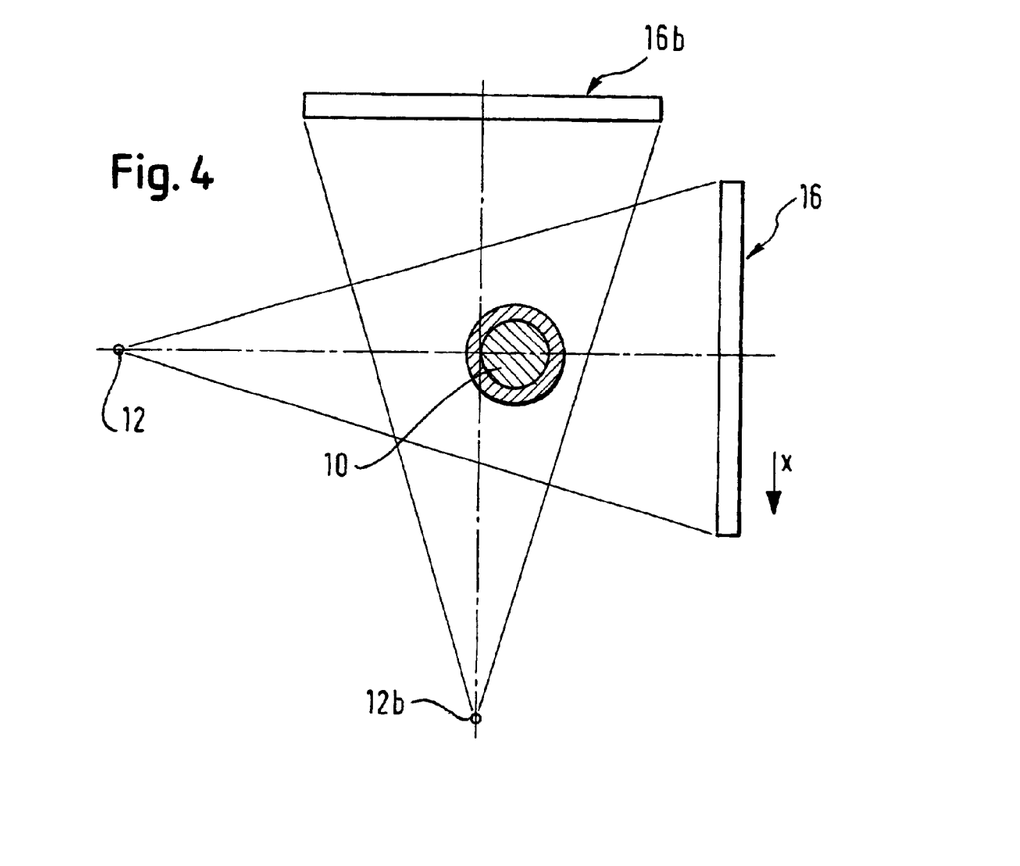
FIG. 4 shows a third embodiment form of a device for carrying out the method according to the invention.

It is generally known to improve the accuracy of the diameter measurement and to determine the ovalness of the article in that along two orthogonal axes a measurement is carried out This may be effected also with a further measuring device as is shown in FIG. 4 and is provided in an arrangement rotated about 90°. In this manner then not only according to the invention can the diameter be measured at two locations but also the distance between the cable 10 and the line sensor 16 or 16b, which is subjected by nature to fluctuations on forward movement of the cable. The intensity patterns in the diffraction patterns on both sides of the cable shadow projected onto the receiver line are approximately cylindrical. Thus e.g. from the positions of feature points lying opposite one another mirror imaged in the left and right diffraction pattern, the middle position of the projected shadow may be concluded. On the connection line between this position and the laser diode 12 there is located the cable 10. A corresponding connection line may be construed for the measuring arrangement rotated about 90°. The intersection point of both lines represents the middle position of the cable 10 in the measuring space. Thus the distance to the respective line sensor 16 or 16a is known. The evaluation device, with which the determination of the diameter is effected, may therefore constantly be fed with these distance values, so that where necessary a correction takes place.

Figure 5:
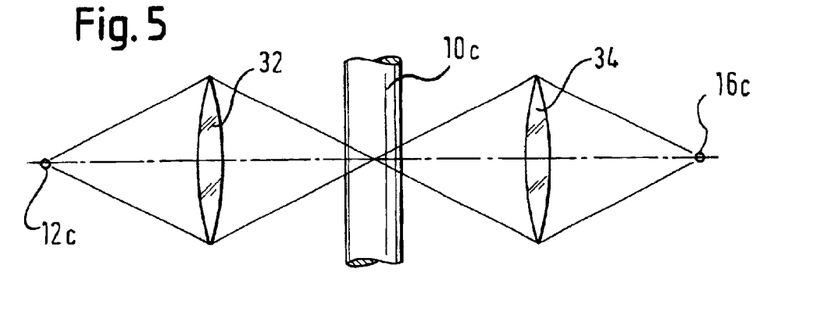
FIG. 5 shows a fourth embodiment form of a device for carrying out the method according to the invention.
Figure 6:
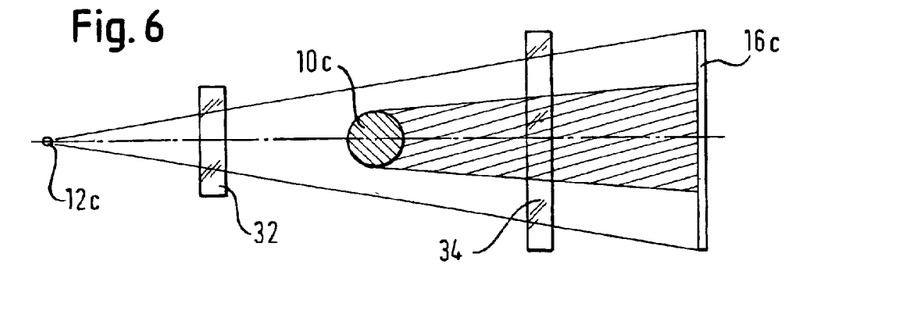
FIG. 6 shows the device according to FIG. 5 rotated about 90°.

In the embodiment form according to FIGS. 5 and 6 a cable 10c, a line sensor 16c and a light source 12 are shown.

In the shown case furthermore cylinder lenses 32, 34 are provided wherein the lens 32 focuses in a line-like manner the irradiation of the light source roughly in the middle of the cable 10*c* in one plane. Transverse to the cable axis there results a linear extension of the fan-shaped illumination. The shadow setting in is indicated in FIG. 6 in a shaded manner.

Additionally or alternatively for the reduction of the dirt sensitivity by way of electronics, means may be provided to prevent contamination in the viewing region of the measuring system in the first place, or to eliminate this. This may for example be effected with the embodiment form according to FIGS. 9 and 10 in that in the region between the laser diode 12*e* on the one hand and the cable 10*e* on the one side and between the cable 10*e* and the CCD line sensor 16*e* on the other side there are arranged slot apertures 50, 52, 54, 56 and an electrode 36 and 38 respectively. The latter lie at a high voltage. The part of the measuring device consisting of the laser 12*e* and the slot apertures 50, 52, or the part consisting of the slot apertures 54, 56 and the sensor line 16*e* may lie at earth. With the help of electrodes 36, 38 an attraction effect is exerted on dust particles. As a result dust is "suctioned out" of the actual measuring space.

Figure 11:
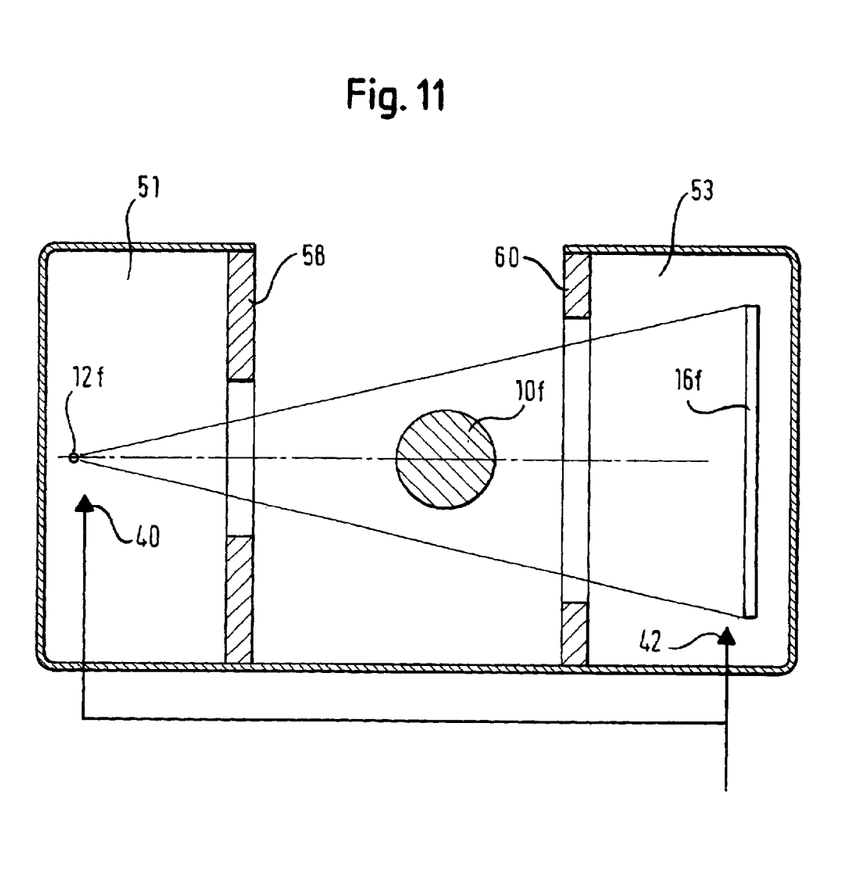
FIG. 11 shows a further embodiment form, in which the dirt particles are removed from the viewing region of the measuring system by air-rinsing.

A further possibility to reduce contaminations may lie in keeping the measuring spaces 51 and 53 according to FIG. 11 clean with the help of slot apertures 58, 60 and where appropriate to set them under a certain excess pressure. By way of this dust particles are prevented from penetrating into the measuring space.

Furthermore with the help of suitable nozzles in an impulsed manner air is blown into the measuring space which is indicated by arrows 40 and 42. With the help of pressure impulses contamination is driven out of the measuring space. Instead of pressure impulses also continuous gasflows may occur which carry contaminations out of the measuring space.

Figure 7:
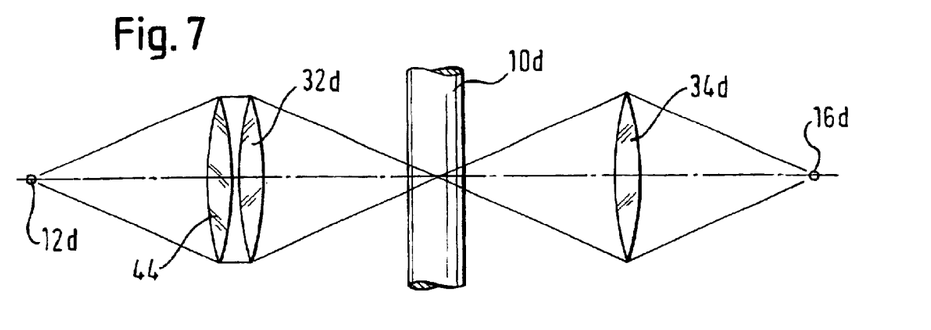
FIG. 7 shows a fifth embodiment form of a device for carrying out the method according to the invention.
Figure 8:
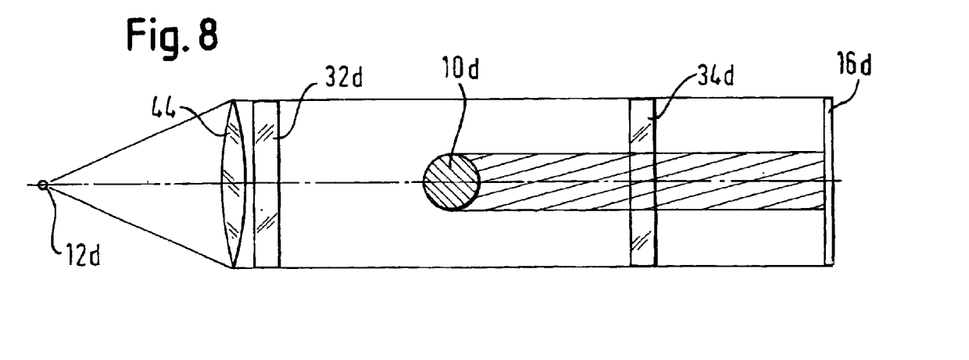
FIG. 8 shows a device according to FIG. 7 rotated about 90°.

It is to be understood that the described measures may of pattern be applied in the same manner to the devices according to FIGS. 1 to 5. The same is the case with the device according to FIGS. 7 and 8 yet to be described.

The difference from the embodiment form according to the FIGS. 5 and 6 lies in the fact that in front of the cylinder lens 33 there is arranged a lens 44. It effects a bundling of the beam path and is in contrast to the fan-shaped beam path according to the embodiment form in FIGS. 5 and 6. The advantage of a bundled beam is described in combination with the embodiment form according to FIG. 3.

The accuracy of the measuring system may be even further increased with the knowledge of the exact momentary wavelength of the light of the laser diode. The wavelength of the light may be evaluated from the diffraction pattern, wherein the distance of the diffraction edge to the light source or to the sensor must be known. The diffraction edge may be that of the article to be measured or also a reference edge which is exactly positioned with regard to the light source or the sensor.

Figure 9:
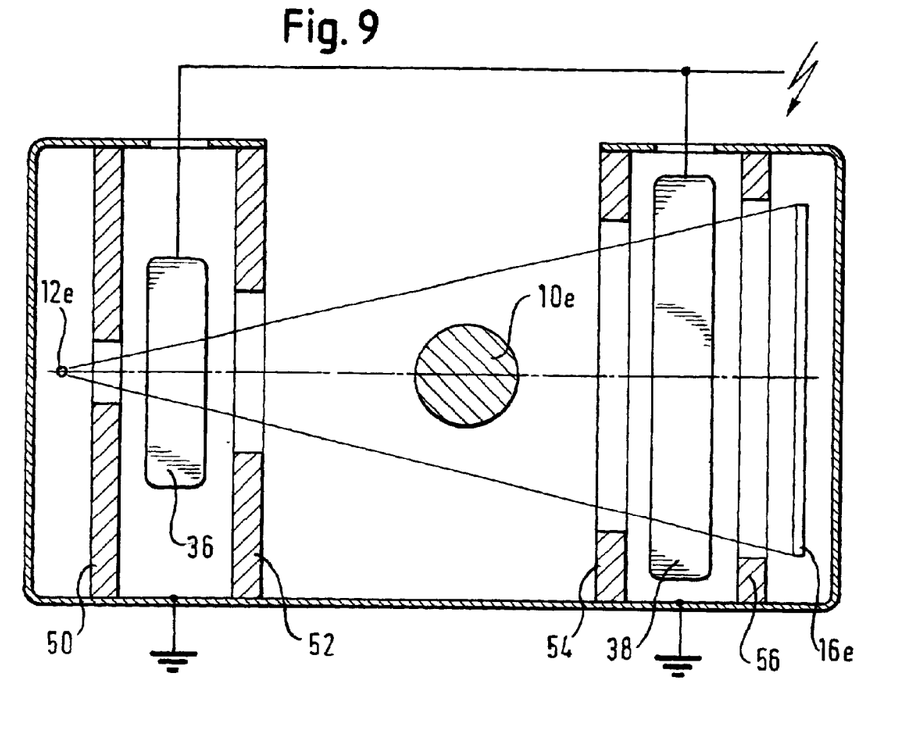
FIG. 9 shows an embodiment form with electrostatic removal of dirt particles from the viewing region of the measuring system.
Figure 12:
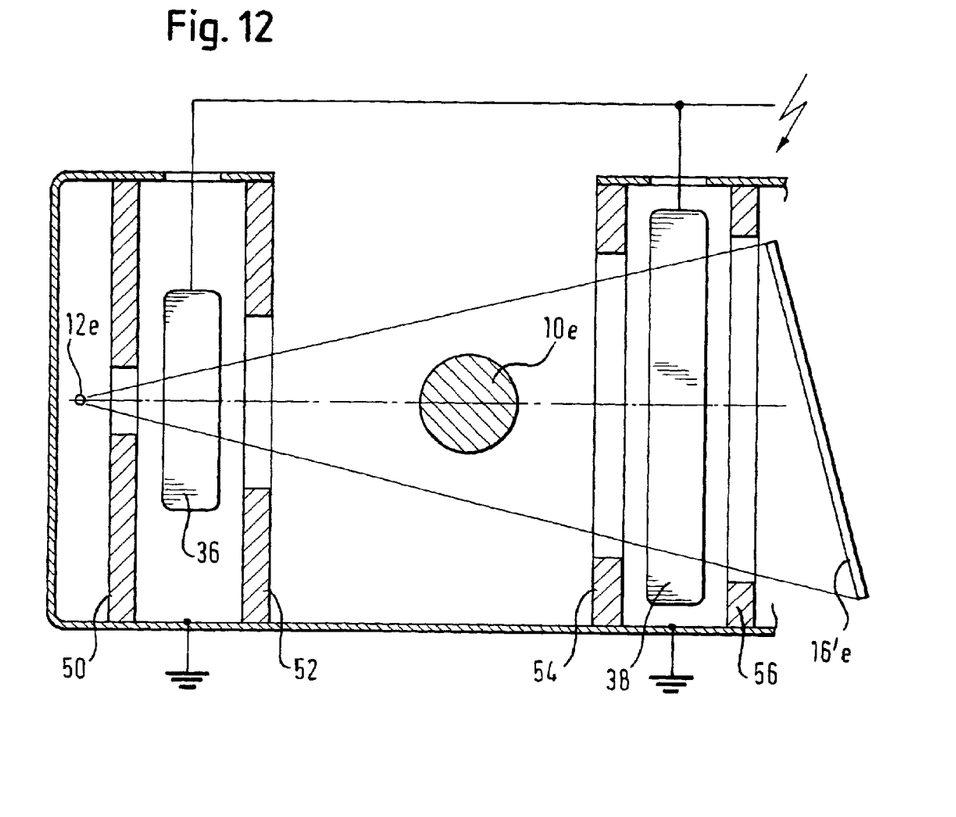
FIG. 12 shows a similar representation as FIG. 9 with a slight modification.

FIG. 12 shows a similar representation as FIG. 9, so that the same parts are provided with the same reference numerals. Different is merely the arrangement of the sensor 16'*e* which is not arranged perpendicular to the arrangement but at a certain inclination.

The computation of the diameter way be carried out just as in the above described type and manner, wherein the oblique positioning of the sensor 16'*e* must be correspondingly corrected. The oblique positioning under circumstances has the advantage that a contamination is more easily prevented.

Figure 10:
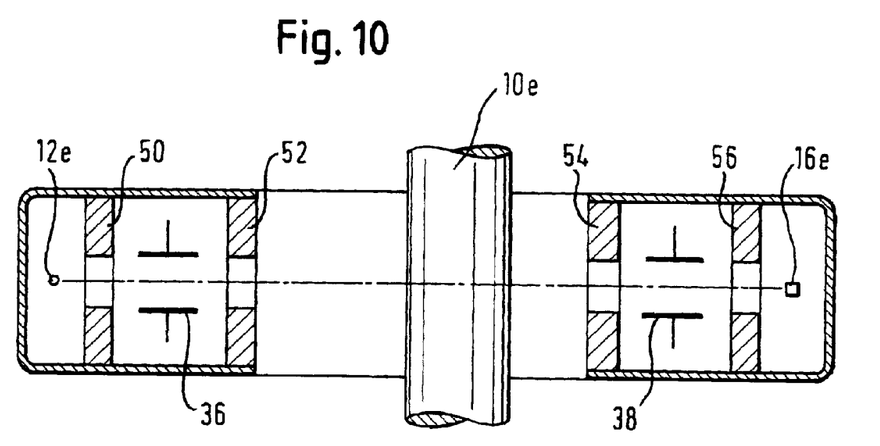
FIG. 10 shows the embodiment form shown in FIG. 9 from above.
Figure 13:
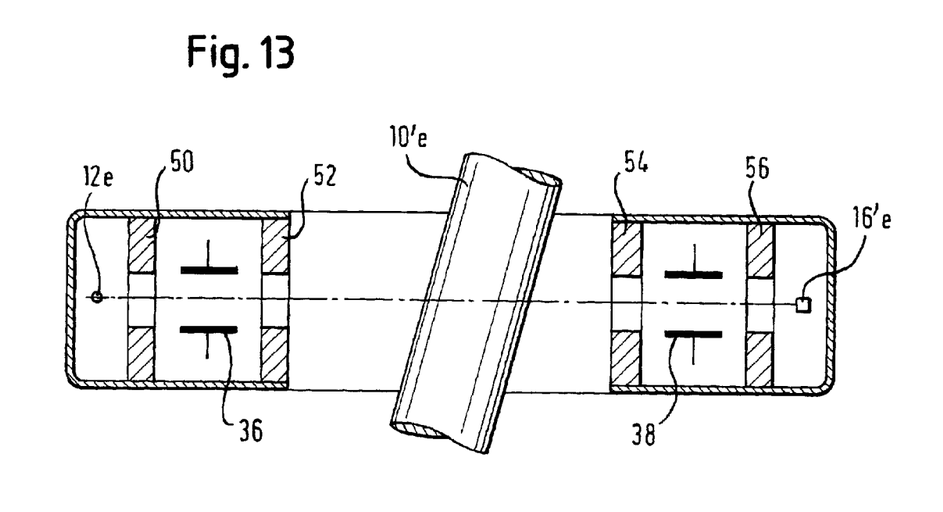
FIG. 13 shows a similar representation to FIG. 10 but with a slight modification.

The embodiment form according to FIG. 13 is equal to that according to FIG. 10 with the exception that the cable 10'*e* or the artery does not extend perpendicularly to the main beam direction, but at an angle.

The embodiment form according to FIGS. 12 and 13 above all things are to illustrate that it is not obligatory that the artery axis must extend perpendicular to the main beam direction. This applies also to the sensor 16'*e*.

What is claimed is:

1. A process for measuring a dimension of an elongated, generally cylindrically-shaped article, comprising:
   a. illuminating a portion of the article using a light source which casts a beam with nonplanar wavefront onto the article;
   b. receiving said nonplanar wavefront beam on a light sensor array, the article interposed between the array and the light source so that the beam and the article create a intensity pattern as received by the array, the intensity pattern corresponding to a dimension of the article;
   c. obtaining from said array a plurality of signals corresponding to light intensity at a plurality of locations in said intensity pattern on said array; and
   d. determining said dimension by evaluating information from said signals corresponding to light intensity at a plurality of locations in said intensity pattern in accordance with Fresnel diffraction theory, and according to the assumption that the wavefront from the light source is nonplanar; and
   e. wherein distances between the source, the article and the array are selected such that the intensity pattern in the vicinity of one shadow edge cast by the article on the array is at most negligibly superimposed on the intensity pattern in the vicinity of the other shadow edge cast by the article on the array.

2. The process of claim 1 wherein evaluating information from said signals is accomplished using information that corresponds to a plurality of characteristic feature points in at least one diffraction pattern in the intensity pattern.

3. The process of claim 2 wherein said characteristic feature points are selected from a group comprising turning points, local centroids, local intensity maxima and local intensity minima in said at least one pattern.

4. The process of claim 1 wherein evaluating information from said signals is accomplished using information that corresponds to a gradient between predetermined characteristic feature points in at least one diffraction pattern in the intensity pattern.

5. The process of claim 1 wherein evaluating information from said signals is accomplished by comparing said information to information corresponding to a reference intensity pattern determined in accordance with Fresnel diffraction theory.

6. The process of claim 1 wherein evaluating information from said signals is accomplished by comparing said information to a plurality of reference intensity patterns determined in accordance with Fresnel diffraction theory.

7. The process of claim 1 wherein the dimension of the article is a diameter of an elongated article.

8. The process of claim 3 wherein the article is moving when its diameter is measured.

9. The process of claim 1 wherein the light source produces monochromatic light.

10. The process of claim 1 wherein at least one contamination-reducing member is interposed between the article and at least one of the array and the light source, said at least one member selected from the group comprising electrostatic apertures, non-electrostatic apertures, compressed gas nozzles and transparent material.

11. The process of claim 1 wherein a transparent material is interposed between said article and at least one of said array and said light source.

12. The process of claim 1 wherein determination of said dimension takes into account the difference between the actual dimension of the article and the dimension of a shadow cast on the array by the article, the difference being caused at least in part by the beam having a nonplanar wavefront.

13. The process of claim 12 wherein determination taking into account said difference includes proportionally compensating for the distance of the article from a member selected from the group of the light source and the array.

14. The process of claim 12 wherein said determination of said dimension includes compensating for the difference between (i) a dimension of the article that casts the shadow on the array and (ii) said dimension of the article that is actually desired to be determined.

15. The process of claim 1 using at least two light sources.

16. The process of claim 1 using at least two light sources and two arrays.

17. The process of claim 1 using two light sources and two arrays, wherein the beams cast by the light sources are substantially perpendicular to each other.

18. The process of claim 17 wherein determination of said dimension relies upon a value corresponding to a distance between an array and the article, and said value is derived using information from said two arrays.

19. A process for measuring a diameter of an elongated article, comprising:
   a. illuminating a portion of the article using a light source which casts a beam with nonplanar wavefront onto the article;
   b. receiving said nonplanar wavefront beam on a light sensor array containing a plurality of elements, the article interposed between the array and the light source so that the beam and the article create a intensity pattern as received by the array, the intensity pattern corresponding to a dimension of the article that casts the intensity pattern on the array and the intensity pattern having at least two diffraction patterns;
   c. obtaining from said array a plurality of signals, each signal corresponding to light intensity from said beam at the location of an element on said array;
   d. determining the distance between the article and a member selected from the group of the light source and the array;
   e. determining said dimension by evaluating (a) information corresponding to said distance and (b) information from said signals corresponding to light intensity at a plurality of locations in said intensity pattern in accordance with Fresnel diffraction theory, and according to the assumption that the wavefront from the light source is nonplanar;
   f. in the process of said determination of said diameter, compensating for the difference between (i) said dimension that casts the intensity pattern on the array and (ii) the diameter of the article; and
   g. wherein distances between the source, the article and the array are selected such that the intensity pattern in the vicinity of one shadow edge cast by the article on the array is at most negligibly superimposed on the intensity pattern in the vicinity of the other shadow edge cast by the array.

20. The process of wherein evaluating information from said signals is accomplished using information that corresponds to a plurality of characteristic feature points in at least one diffraction pattern in the intensity pattern.

21. The process of claim 20 wherein said characteristic feature points are selected from a group comprising turning points, local centroids, local intensity maxima and local intensity minima in said at least one pattern.

22. The process of claim 19 wherein evaluating information from said signals is accomplished using information that corresponds to a gradient between predetermined characteristic feature points in at least one diffraction pattern in the intensity pattern.

23. The process of claim 19 wherein evaluating information from said signals is accomplished by comparing said information to information corresponding to a reference intensity pattern determined in accordance with Fresnel diffraction theory.

24. The process of claim 19 wherein evaluating information from said signals is accomplished by comparing said information to a plurality of reference intensity patterns determined in accordance with Fresnel diffraction theory.

25. A process for measuring a dimension of an article, comprising;
   a. illuminating a portion of the article using a first light source which casts a first beam with a nonplanar wavefront onto the article;
   b. receiving said first beam on a first light sensor array containing a plurality of elements, the article interposed between the first array and the first light source so that the first beam and the article create a first intensity pattern as received by the first array, the first intensity pattern corresponding to the dimension of the article;
   c. obtaining from a plurality of elements in said first array a set of first signals corresponding to tight intensity from said first beam at a plurality of locations in said first intensity pattern on said first array;
   d. illuminating a portion of the article using a second light source which casts a second beam with a nonplanar wavefront onto the article;
   e. receiving said second beam on a second light sensor array containing a plurality of elements, the article interposed between the second array and the second light source so that the second beam and the article create a second intensity pattern as received by the second array, the second intensity pattern also corresponding to the dimension of the article;
   f. obtaining from a plurality of elements in said second array a set of second signals corresponding to tight intensity from said second beam at a plurality of locations in said second intensity pattern on said second array; and
   g. determining said dimension by evaluating information from at least one of said first and second sets of signals corresponding to light intensity at a plurality of locations in said first and second intensity patterns in accordance with Fresnel diffraction theory the determination conducted according to the assumption that the wavefront from the light source is nonplanar;
   h. wherein determination of said dimension takes into account the difference between the actual dimension of the article and the dimension of a shadow cast on at least one array by the article, the difference being caused at least in part by the beam having a nonplanar wavefront.

26. The process of claim 25 wherein evaluating information from said signals is accomplished using information that corresponds to a plurality of characteristic feature points in at least one diffraction pattern in at least one of said intensity patterns.

27. The process of claim 26 wherein said characteristic feature points are selected from a group comprising turning points, local centroids, local intensity maxima and local intensity minima in said at least one pattern.

28. The process of claim 25 wherein evaluating information from said signals is accomplished using information that corresponds to a gradient between predetermined characteristic feature points in at least one diffraction pattern in at least one of the intensity patterns.

29. The process of claim 25 wherein evaluating information from said signals is accomplished by comparing said information to information corresponding to a reference intensity pattern determined in accordance with Fresnel diffraction theory.

30. The process of claim 25 wherein evaluating information from said signals is accomplished by comparing said information to a plurality of reference intensity patterns determined in accordance with Fresnel diffraction theory.

31. The process of claim 25 wherein the dimension is a diameter and wherein the article is moving when its diameter is measured.

32. The process of claim 25 wherein the light sources produce monochromatic light.

33. The process of claim 25 wherein at least one contamination-reducing member is interposed between the article and at least one of the array and the light source, said at least one member selected from the group comprising electrostatic devices, non-electrostatic apertures, compressed gas nozzles, creation of an overpressure and transparent material.

34. The process of claim 25 wherein transparent material is interposed between said article and at least one of said array and said light source.

35. The process of claim 25 wherein said determination of said dimension takes into account distance of the article relative to at least one member selected from the group comprising said light sources and said arrays, and wherein information corresponding to said distance is determined from at least one of said first and second sets of signals.

36. The process of claim 35 wherein said determination of said dimension relies upon a value corresponding to a distance between an array and the article.

37. The process of claim 25 wherein distances between the sources, the article and the arrays are selected such that the intensity patterns in the vicinity of one shadow edge cast by the article on each array is at most negligibly superimposed on the intensity pattern in the vicinity of the other shadow edge cast by the article on the array.

38. The process of claim 25 wherein said determination of said dimension includes compensating for the difference between (i) a dimension of the article that casts the shadow on the array and (ii) said dimension of the article that is actually desired to be determined.

39. A process for measuring a dimension of an elongated, generally cylindrically-shaped article, comprising:
 a. illuminating a portion of the article using a light source which casts a beam with nonplanar wavefront onto the article;
 b. receiving said nonplanar wavefront beam on a light sensor array, the article interposed between the array and the light source so that the beam and the article create a intensity pattern as received by the array, the intensity pattern corresponding to a dimension of the article;
 c. obtaining from said array a plurality of signals corresponding to light intensity at a plurality of locations in said intensity pattern on said array; and
 d. determining said dimension by evaluating information from said signals corresponding to light intensity at a plurality of locations in said intensity pattern in accordance with Fresnel diffraction theory, and according to the assumption that the wavefront from the light source is nonplanar; and
 e. filtering said signals corresponding to light intensity at a plurality of locations said intensity pattern in order to attenuate effects of dirt.

40. The process of claim 39 wherein evaluating information from said signals is accomplished using information that corresponds to a plurality of characteristic feature points in at least one diffraction pattern in the intensity pattern.

41. The process of claim 40 wherein said characteristic feature points are selected from a group comprising turning points, local centroids, local intensity maxima and local intensity minima in said at least one pattern.

42. The process of claim 39 wherein evaluating information from said signals is accomplished using information that corresponds to a gradient between predetermined characteristic feature points in at least one diffraction pattern in the intensity pattern.

43. The process of claim 39 wherein evaluating information from said signals is accomplished by comparing said information to information corresponding to a reference intensity pattern determined in accordance with Fresnel diffraction theory.

44. The process of claim 39 wherein evaluating information from said signals is accomplished by comparing said information to a plurality of reference intensity patterns determined in accordance with Fresnel diffraction theory.

45. The process of claim 39 wherein the dimension of the article is a diameter of an elongated article.

46. The process of claim 45 wherein the article is moving when its diameter is measured.

47. The process of claim 39 wherein the light source produces monochromatic light.

48. The process of claim 39 wherein at least one contamination-reducing member is interposed between the article and at least one of the array and the light source, said at least one member selected from the group comprising electrostatic apertures, non-electrostatic apertures, compressed gas nozzles and transparent material.

49. The process of claim 39 wherein a transparent material is interposed between said article and at least one of said array and said light source.

50. The process of claim 39 wherein determination of said dimension takes into account the difference between the actual dimension of the article and the dimension of a shadow cast on the array by the article, the difference being caused at least in part by the beam having a nonplanar wavefront.

51. The process of claim 50 wherein determination taking into account said difference includes proportionally compensating for the distance of the article from a member selected from the group of the light source and the array.

52. The process of claim 50 wherein said determination of said dimension includes compensating for the difference between (i) a dimension of the article that casts the shadow on the array and (ii) said dimension of the article that is actually desired to be determined.

53. The process of claim 39 using at least two light sources.

54. The process of claim 39 using at least two light sources and two arrays.

55. The process of claim 39 using two light sources and two arrays, wherein the beams cast by the light sources are substantially perpendicular to each other.

56. The process of claim 55 wherein determination of said dimension relies upon a value corresponding to a distance between an array and the article, and said value is derived using information from said two arrays.

* * * * *

UNITED STATES PATENT AND TRADEMARK OFFICE
CERTIFICATE OF CORRECTION

PATENT NO. : 6,922,254 B2
DATED : July 26, 2005
INVENTOR(S) : Werner Blohm, Harald Sikora and Adrian Beining It is certified that error appears in the above-identified patent and that said Letters Patent is hereby corrected as shown below:

Column 2,
Lines 10, 13 and 55, delete "extension" and insert -- expansion --.
Line 41, delete the second occurrence of "the".
Line 59, delete "objective" and insert -- object --.
Line 59, delete second occurrence of "also".

Column 3,
Line 62, delete "sa" and insert -- a --.
Line 66, delete "extension" and insert -- expansion --.

Column 4,
Line 1, delete "feather" and insert -- feature --.
Line 3, delete "extensions" and insert -- expansion --.
Line 15, delete "if" and insert -- of --.
Line 15, delete "courses" and insert -- patterns --.
Line 37, delete "earth" and insert -- ground potential --.

Column 6,
Line 19, delete the period after "leads".
Line 22, delete "extension" and insert -- expansion --.
Line 36, delete "bundled".
Line 41, delete "ovalness" and insert -- ovality --.
Line 58, delete "construed" and insert -- constructed --.

Column 7,
Line 20, delete "earth" and insert -- ground potential --.
Line 37, delete "pattern" and insert -- course --.
Line 62, delete "way" and insert -- may --.

Column 8,
Line 61, delete "claim 3" and insert -- claim 7 --.

Column 9,
Line 66, after "The process of" insert -- claim 19 --.

UNITED STATES PATENT AND TRADEMARK OFFICE
CERTIFICATE OF CORRECTION

PATENT NO.    : 6,922,254 B2
DATED         : July 26, 2005
INVENTOR(S)   : Werner Biohm, Harald Sikora and Adrian Beining It is certified that error appears in the above-identified patent and that said Letters Patent is hereby corrected as shown below:

Column 10,
Lines 31 and 45, delete "tight" and insert -- light --.
Lines 53-54, delete "the determiniation conducted" and insert -- , and --.

Signed and Sealed this

Fourteenth Day of February, 2006

JON W. DUDAS
*Director of the United States Patent and Trademark Office*